(12) United States Patent
Chawla et al.

(10) Patent No.: US 6,772,409 B1
(45) Date of Patent: Aug. 3, 2004

(54) SPECIFICATION TO ABAP CODE CONVERTER

(75) Inventors: Sachinder S. Chawla, San Francisco, CA (US); Jason Chen, Fremont, CA (US); Alex Gorelik, Fremont, CA (US); Hon C. Thio, Castro Valley, CA (US); Dave Wang, San Jose, CA (US)

(73) Assignee: ACTA Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/260,121

(22) Filed: Mar. 2, 1999

(51) Int. Cl.[7] .............................................. G06F 9/44
(52) U.S. Cl. ...................... 717/106; 717/117; 717/137
(58) Field of Search ....................... 717/2, 1, 100–157; 707/103; 709/224

(56) References Cited

U.S. PATENT DOCUMENTS

| | | | |
|---|---|---|---|
| 5,448,740 A | * 9/1995 | Kiri et al. | 717/155 |
| 5,530,848 A | * 6/1996 | Gilbert et al. | 709/313 |
| 5,758,032 A | * 5/1998 | Sanders | 706/46 |
| 5,815,713 A | * 9/1998 | Sanders | 717/2 |
| 6,148,335 A | * 11/2000 | Haggard et al. | 709/224 |
| 6,192,370 B1 | * 2/2001 | Primsch | 709/224 |

FOREIGN PATENT DOCUMENTS

| | | |
|---|---|---|
| EP | 0511437 A1 | 4/1991 |
| EP | 602263 A1 | 12/1992 |
| EP | 0737918 A2 | 10/1996 |

OTHER PUBLICATIONS

SAP R/3 Data Warehousing and Application Integration pp. 1–17.*
Enterprise Data Warehousing for Sap R/3 © 1998 pp. 1–17.*
Thomas Curran, "Technical Review: SAP's ABAP/s Development Workbench," *Object Manager*, pp. 10–15 (Dec., 1994).
C. J. Date, "An Introduction to Database Systems, vol. 1, 5th Edition," Addison–Wesley Publishing Company, pp. 455–488 (1990).

* cited by examiner

*Primary Examiner*—Tuan Dam
*Assistant Examiner*—Chuck Kendall
(74) *Attorney, Agent, or Firm*—Philip H. Albert; Brian N. Young; Townsend and Townsed and Crew, LLP

(57) ABSTRACT

A method of generating procedural language code for extracting data from a data warehouse comprising the steps of accepting a declarative specification and generating procedural language code to execute the declarative specification.

18 Claims, 6 Drawing Sheets

```
CREATE VIEW MyJoin (VBELN char(10)KEY, POSNR varchar(6)
KEY, AUART char(4), VKGRP char(3), VKBUR char(4), GUEBG
date, GUEEN date, BNAME char(35), MATNR char(18), MATWA
char(18), KMPMG decimal(13,3), WAVWR decimal(13,2), NETPR
decimal(11,2))

AS SELECT VBAK.VBELN, VBAP.POSNR, VBAK.AUART,
VBAK.VKGRP, VBAK.VKBUR, VBAK.GUEBG, VBAK.GUEEN,
VBAK.BNAME, VBAP.MATNR, VBAP.MATWA, VBAP.KMPMG,
VBAP.WAVWR, VBAP.NETPR
    FROM VBAK,VBAP
        WHERE VBAK.VBELN = VBAP.VBELN;
```

FIG. 5

```
CREATE VIEW MyJoin (VBELN char(10) KEY, POSNR varchar(6) KEY, AUART
char(4), VKGRP char(3), VKBUR char(4), GUEBG date, GUEEN date, BNAME
char(35), MATNR char(18), MATWA char(18), KMPMG decimal(13,3), WAVWR
decimal(13,2), NETPR decimal(11,2))

AS SELECT VBAK.VBELN, VBAP.POSNR, VBAK.AUART, VBAK.VKGRP,
VBAK.VKBUR, VBAK.GUEBG, VBAK.GUEEN, VBAK.BNAME, VBAP.MATNR,
VBAP.MATWA, VBAP.KMPMG, VBAP.WAVWR, VBAP.NETPR
    FROM VBAK,VBAP
        WHERE VBAK.VBELN = VBAP.VBELN AND VBAP.POSNR = 'XYZ123';
```

FIG. 6

SPECIFICATION TO ABAP CODE CONVERTER

BACKGROUND OF THE INVENTION

The present invention relates to database processing in general and to generation of ABAP code in particular.

SAP R/3 system is an Enterprise Resource Management system used to manage various IT subsystems used to operate a company (e.g., manufacturing, sales and distribution, logistics) in an integrated fashion. A typical SAP R/3 installation requires extensive configuration to embed the specific business rules for the company using SAP R/3 into the system as well as produce the reports required by the company. Most of a generic SAP R/3 system as well as most of the configuration and reporting is written using the ABAP/4 language.

One approach to extracting data uses ETL ("Extraction, Transformation and Loading") tools to convert a procedural specification into a procedural language to execute that specification. However, since the specification is a procedural specification, the user has to manually specify the optimal (most efficient and fastest) way of executing the specification.

SUMMARY OF THE INVENTION

According to one embodiment of the present invention, procedural language code is generated for extracting data from an operational system such as an SAP R/3 system, for transforming it and for loading it into a target system, such as a data warehouse. This is done by accepting a declarative specification and generating procedural language code to execute the declarative specification.

The data extraction process for extracting data from an SAP R/3 system accepts a declarative specification, in visual form or otherwise, and uses an optimizer to optimize the specification and generate an execution plan to perform the extractions and transformations specified in the declarative specification. The process then generates a procedural program in the ABAP language to perform the operation. This approach allows the user to focus on what needs to be done, while the system takes care of the most efficient way for how to do it. Figuring out the most efficient way for executing the specification is a complicated process and will take much effort if done manually by the user. This approach is particularly beneficial when the specification is revised, because the system can easily reoptimize the entire specification and produce a new optimal plan.

A further understanding of the nature and advantages of the inventions herein may be realized by reference to the remaining portions of the specification and the attached drawings.

BRIEF DESCRIPTION OF THE DRAWINGS

FIG. 5 is an illustration of a set of declarative language statements.

FIG. 6 is a second illustration of a set of declarative language statements.

This application includes two appendices listing ABAP program code.

DESCRIPTION OF THE SPECIFIC EMBODIMENTS

Figure 1:
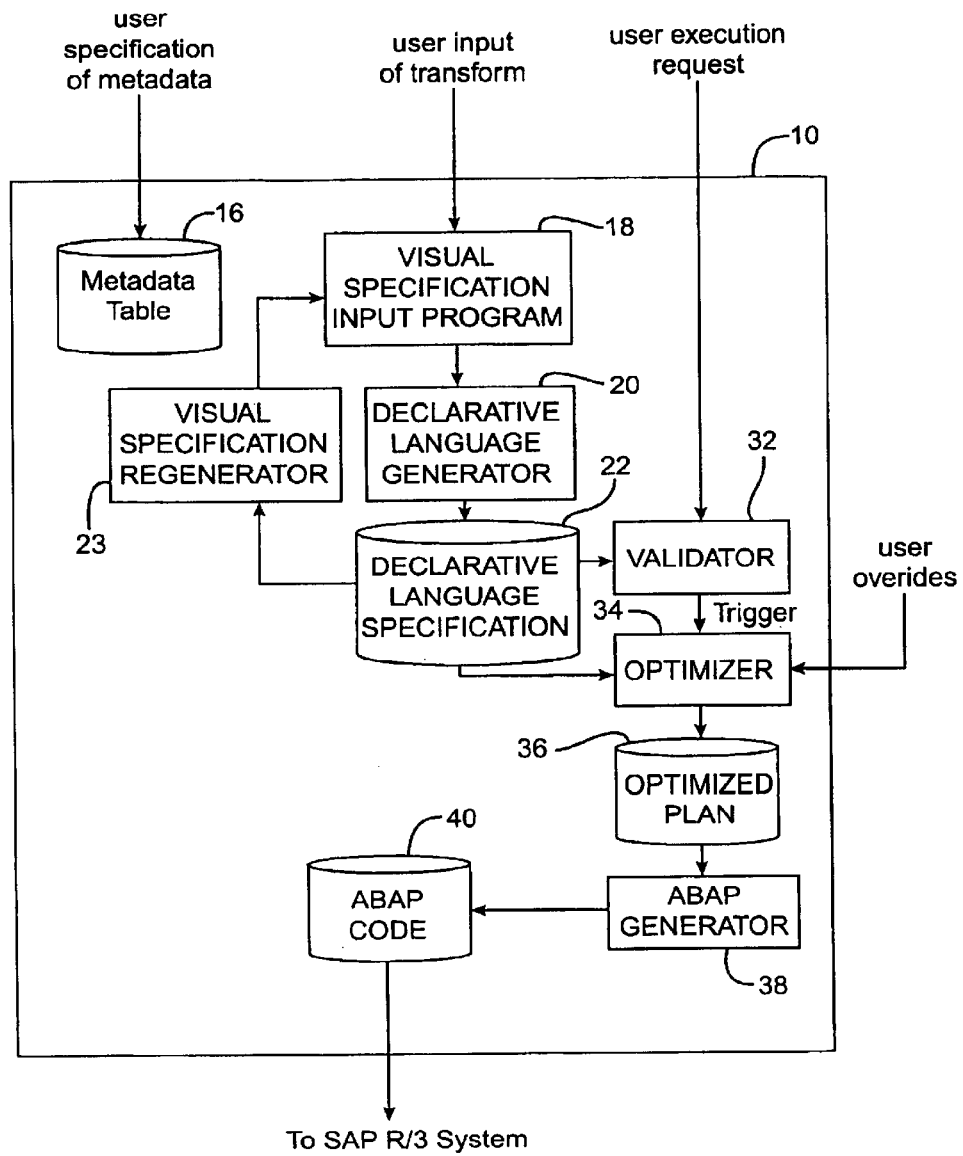
FIG. 1 is a block diagram of a converter according to one embodiment of the present invention for generating an ABAP program from a specification.
Figure 7:
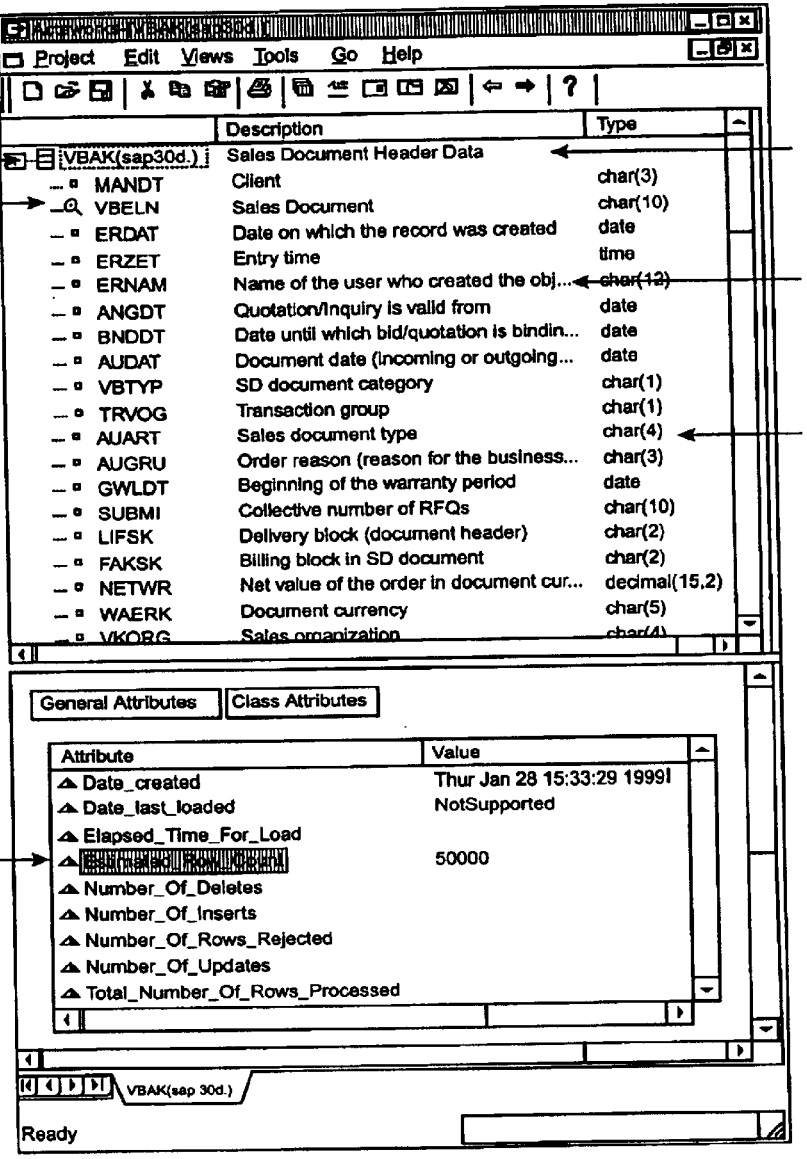
FIG. 7 is an illustration of metadata imported for a table from an SAP R/3 system.

There are three steps to optimized ABAP generation as performed by a converter 10 of specifications to ABAP code used to extract data from a SAP R/3 system. Such a converter 10 is shown generally in FIG. 1. The first step is importing metadata about the SAP data that the ABAP code will access. This metadata includes an indication of what SAP tables are available for reading and the columns, keys, sizes and primary-foreign key relationships for those tables. A sample of such metadata is shown in FIG. 7. The metadata is extracted from the SAP data dictionary and stored in a metadata repository 16.

The second step is specifying the transformations to be made by the converter. In a preferred embodiment, a user visually specifies the transformations. For example, a user might use an input device to input the transformations, including the sources, targets for the transformations by way of a visual specification input program 18 (see FIG. 3). A declarative language generator 20 then generates a declarative language specification from the visual representation and stores the specification in a repository 22. If the user wants to change the specification, the declarative language specification is read from repository 22, converted to a visual representation by a regenerator 23, and displayed to the user using visual specification input program 18. Any changes made to the visual specification are converted back into the declarative language specification and stored back in the repository 22. Each declarative language specification stored in repository 22 is named by the user with a job name.

The third step is executing the transformation specification from repository 22 upon user request. This is done by various elements shown in FIG. 1. Once triggered by a user, a validator 32 reads a specification having the job name requested by the user from repository 22 and validator 32 validates the specification against the imported metadata stored in metadata table 16. Validator 32 ensures that, for example, the tables and columns used in the specification exist, column types match the metadata or, if they do not match, can be converted automatically. For example, an integer can be converted to a string, but a date might not be convertible to a floating-point number automatically. Other validations include ensuring that all columns and tables exist and that the correct number and type of parameters are passed to functions.

Figure 4:
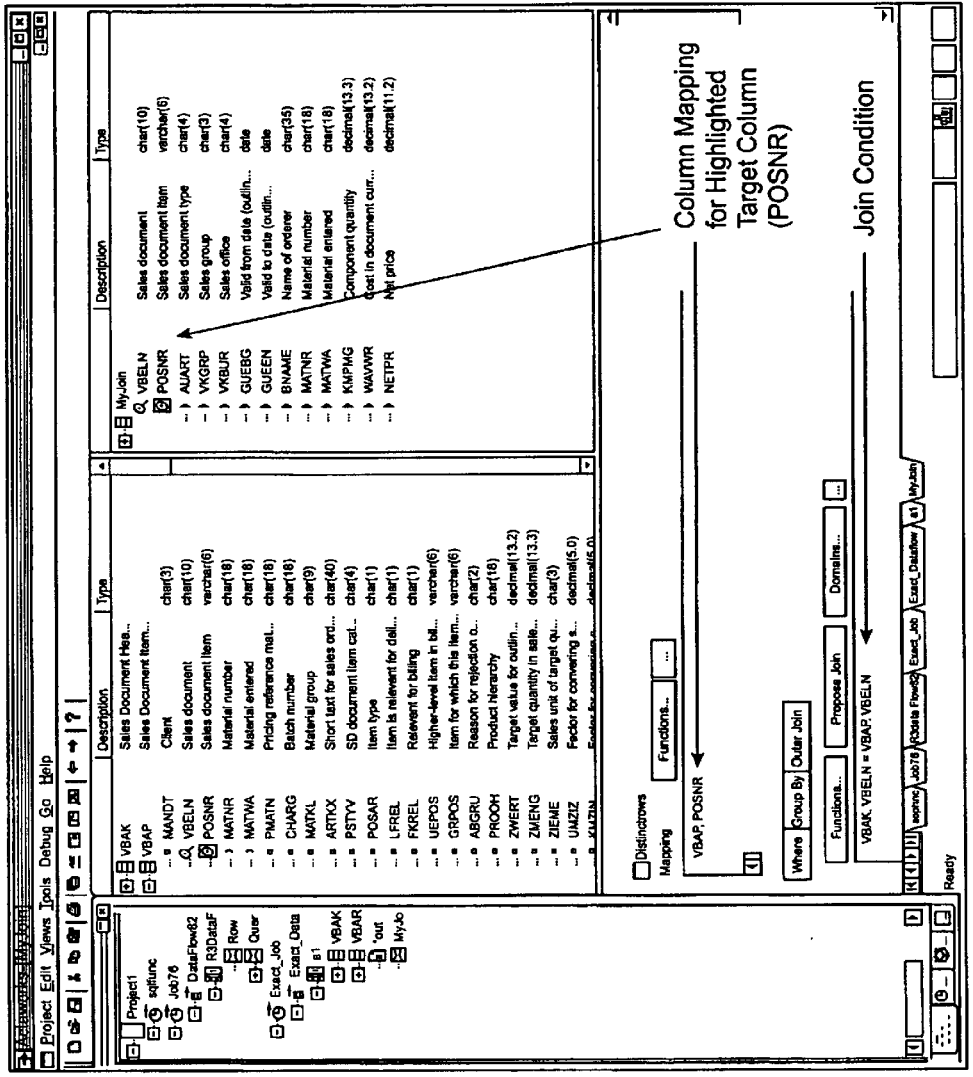
FIG. 4 is a screen shot of a display of a computer system used to graphically input specifications.

Once validator 32 validates the specification, validator 32 passes the specification, or a reference thereto, to an optimizer 34. If validator 32 does not validate the specification, it does not pass the specification on and issues an error message. Optimizer 34 determines the optimum way to perform the tasks specified in the specification. An example of this is shown in FIGS. 4–5. The output of optimizer 34 is an optimized "plan" 36. The optimizer uses all available information such as sizes of tables, key information, index information and primary-foreign key relationships to determine the best way to perform the tasks. The best way is generally the least computationally intensive (i.e., using the least amount of computer resources), but may also be defined as the fastest regardless of how many resources it uses. In some cases, the users may choose to override the optimizer by specifying the plan themselves.

Optimizer 34 provides the optimized plan 36 to an ABAP code generator 38, which generates the ABAP language code 40 usable to execute the plan. The specification tells the converter 10 what to extract, transform and load while the plan is an optimized execution plan generated by the optimizer that tells converter 10 how to extract, transform and load the data. Samples of such code can be found in the appendices to this application.

Figure 2:
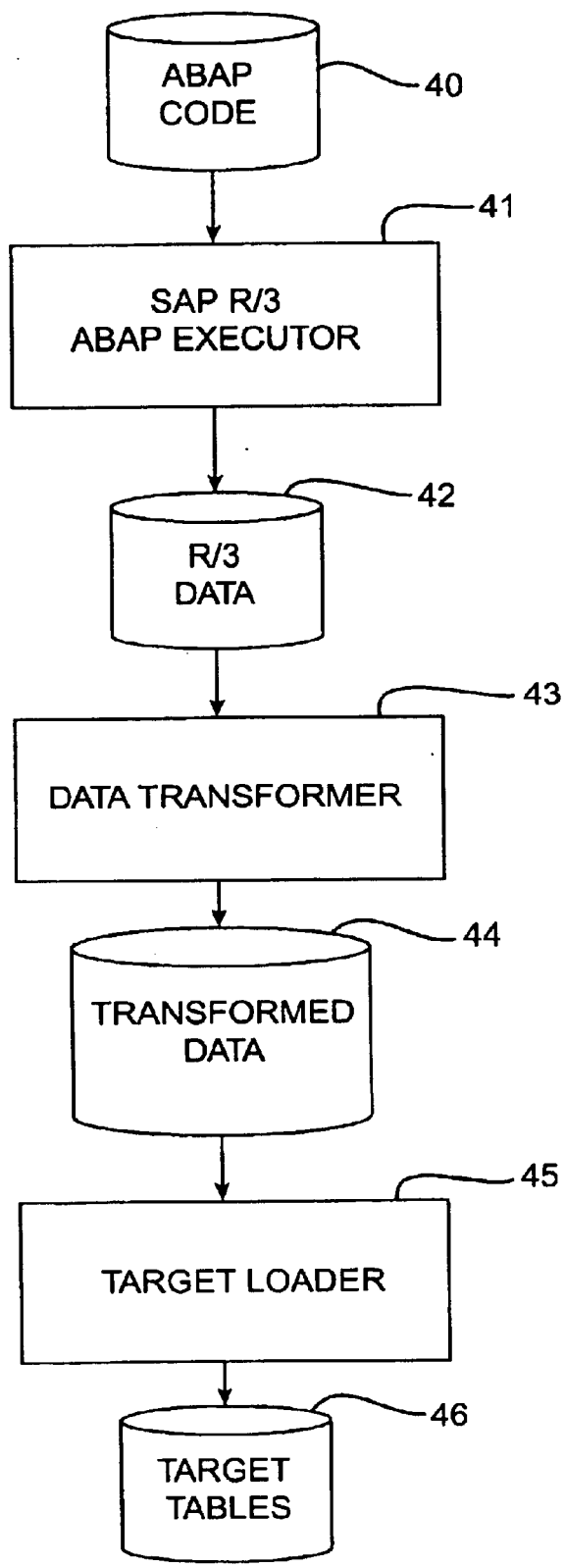
FIG. 2 is a block diagram of a process for executing an ABAP program according to one embodiment of the present invention.

ABAP code 40 is then executed by the SAP R/3 system and the data retrieved from SAP, as illustrated in FIG. 2. As shown there, a SAP R/3 ABAP executor 41 executes ABAP code 40, resulting in R/3 data 42 and a data transformer 43 transforms R/3 data 42 into transformed data 44 according to the user specification. For example, if the SAP-specific part extracts a list of employees from SAP, additional transformations performed outside of the SAP R/3 system may look up salary paid to date from a payroll system in an Oracle™ database as well as a 401K balance stored in a PeopleSoft™ employee tracking system] A target loader 45 then uses this transformed data 44 to populate target tables 46. A target table 46 is typically (but not necessarily) in a data warehouse. It is populated with the data extracted from the operational systems and transformed according to the user specifications as described above.

Figure 3:
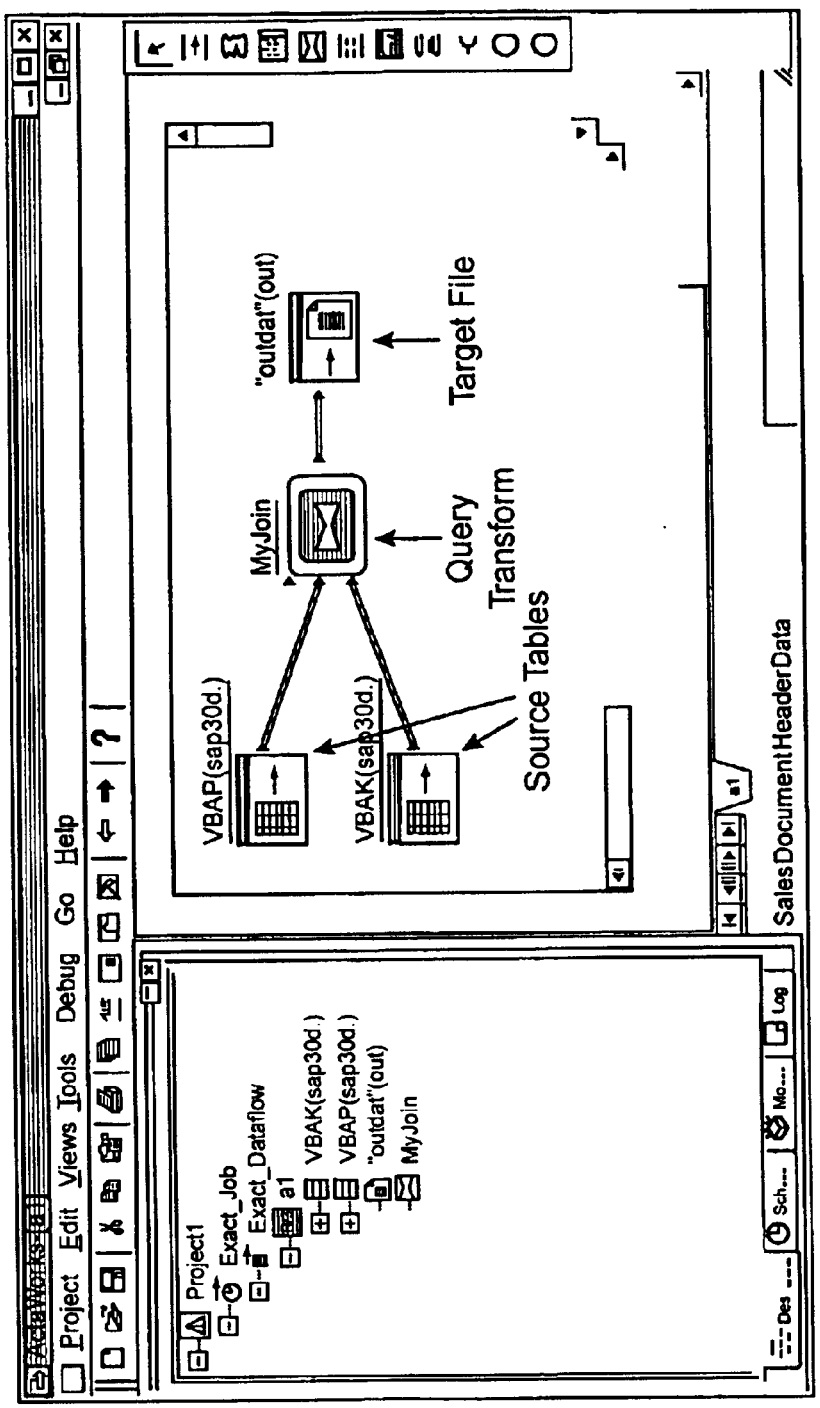
FIG. 3 is a screen shot of a display of a computer system used to generate a visual representation of a specification.

FIG. 3 illustrates the table inputs and outputs as well as the query transform. The Source tables are inputs into the Query Transform called MyJoin. The results of the query are loaded into the target file.

FIG. 4 is a screen shot of a display of the specification of the join in MyJoin Query Transform shown in FIG. 3. As shown therein, the join condition is specified in the Where tab, while the mappings for the columns are displayed in the Mapping window. The diagram shows the mapping for the highlighted column (POSNR) which is set to the value of the POSNR column of the input table VBAP.

An example of the declarative language resulting from the visual specification shown in FIG. 4 is shown in FIG. 5. The declarative language statements are a dialect of SQL called ATL, which is short for "Acta Transformation Language", a language developed by the assignee of the present application. Although the statements are shown in ATL, they could be represented in any declarative language.

In the example described above, optimizer 34 would determine that VBAK (the order header) is much smaller than VBAP (the line item), as each order typically has multiple line items. Therefore, optimizer 34 would set up a loop join with VBAK as the outer table and VBAP as the inner table. A query server executing a loop join selects a row from VBAK (an order header), then gets all rows from VBAP that match the Sales Document number (VBELN) for that order (all the line items).

Appendix A is a listing of the generated ABAP program, with the code corresponding to the join shown in bold.

Another example of generated ABAP code is shown in FIG. 6. There, an additional condition exists on the line item. Optimizer 34 would notice that since it has a predicate on the primary key for the VBAP table, it would only get a single row from that table. Therefore, it would be a less work computationally to select a single order line item from VBAP (the one with POSNR='XYZ123') and then look up the order header record for it from VBAK, then to go through ALL the order headers (VBAK) and for each to go through all the line items (VBAP) until we find the one with POSNR='XYZ123'. Therefore, the optimizer would then make VBAP the outer table and generate the ABAP code shown in Appendix B.

In a specific example, converter 10 processes a declarative specification to generate a procedural language program and executes the procedural language program. The declarative specification specifies what to do, but not necessarily how to do it. For example, a specification might specify joining an employee table with address tables based on employee ID. In SQL, a statement to this effect might be:

SELECT EMPLOYEE.NAME, ADDRESS.STREET_ADDRESS

FROM EMPLOYEE, ADDRESS WHERE

EMPLOYEE.EMPLOYEE_ID = ADDRESS.EMPLOYEE_ID

It is up to converter 10 to figure out the best way to execute that specification and join the two tables. One way to join the tables is to take a row from the employee table, extract the employee ID, read the address table and, for every row, check for a match of the row's employee ID and the employee ID extracted from the employee table and return the two rows in the case of a match.

One way to execute the specification is to generate ABAP code and execute that ABAP code. ABAP is a procedural language used by the SAP R/3 system. Converter 10, in addition to generating ABAP code, applies query optimization techniques to the specification in generating the ABAP code optimally.

Converter 10 can generate ABAP code for both scalar functions and vector functions. ABAP programmers can create functions in the ABAP language, but such functions do not return any value and have input and output parameters. Using the code generating capabilities of converter 10, however, a declarative specification could include calls to scalar functions. An example of a scalar function usage is:

SELECT FOO(T.A)::Y FROM T WHERE FOO(T.B)::Z>10 where the function FOO has one input parameter (X) and two output parameters (Y and Z). The above function comprises two calls. In the first call, column A is passed as input parameter X and the value of output parameter Y is returned by the function. In the second call, column B is passed as the input parameter X and the value of output parameter Z is returned by the function and compared to 10. In addition, functions can be used to return multiple values. For example, the select statement SELECT FOO(T.A) FROM T would return the values of the two output parameters (Y and Z) and is equivalent to SELECT FOO(T.A)::Y, FOO(T.A)::Z FROM T. Converter 10 handles generating all of the ABAP code necessary to effectuate such a scalar function, allowing a specification to specify more complex functions.

As for vector functions, converter 10 generates ABAP language for vector functions, in which input and/or output parameters can be tables. Converter 10 processes vector functions, if they are present in a declarative specification, by generating the appropriate procedural (ABAP) program to execute that specification. The ABAP code generated by converter 10 handles a wide range of other operations. For example, ABAP code to read and load R/3 tables and files is supported. Another supported operation is table lookup, which is an operation that returns a value from a table given values for a set of keys. For example, given an employee ID, a table lookup operation may return the employee's department number from the department table.

Converter 10 also handles parameterized declarative extraction specifications and generates therefrom parameterized ABAP programs for extracting data from SAP R/3 such that parameters can be passed at run-time to affecting the operation of the ABAP program. In some cases, the data being joined as a result of a specification is includes some R/3 data and some non-R/3 data, including relational databases and files.

The data can be joined from a single declarative specification. The result of the conversion of such a specification is set of ABAP programs, SQL queries and in-memory transformation modules to extract, transform and load the data from the multiple sources.

In some embodiments, converter 10 can carry through user-written ABAP code to be combined with the generated ABAP code. A user can write custom ABAP code and specify the output schema for the custom code. In this way, the custom code can be executed as part of the extraction specification and to the data generated by this custom ABAP code can be used in subsequent transformations.

Normally, declarative specifications do not allow for a specified number of iterations, but converter 10 accepts iterator participation in a declarative specification. An iterator can be implemented as an ordered set of integers. The set size is specified by the user. This set can be combined with other operations to simulate a set number of iterations. For example, an iterator set of 12 can be joined with an employee table to return a set of the 12 highest paid employees. Another example is that an iteration set of 100 can be used to call a function 100 times—one for each row in the set. In this way, an iterator set can be used to simulate iterations for declarative languages, such as SQL, that do not have iteration operations.

Converter 10 also generates ABAP code to integrate IDOCs (Intermediate DOCuments) with relational tables. IDOCs are hierarchical multi-set structures in which each level is called a segment. Each segment contains rows of columns as well as other segments (called subsegments). For example, a segment can have columns A and B and segments C and D where A is an integer, B is a string(10) field and C is a segment with columns X, Y and subsegment Z, where X is an integer, Y is an integer and Z is a segment, etc. Each row of such a segment would have a value for column A, a value for column B and two subsegments C and D, where subsegment C would have a set of rows where each row has a value for column X, a value for column Y and a subsegment Z, and so on. An example of an IDOC description report generated by SAP R/3 is included in Appendix C. The IDOC format for intermediate documents is a SAP specific format, typically used for electronic data interchange ("EDI") and Application Linking and Embedding ("ALE") used for communication between different SAP systems.

An IDOC is characterized by an IDOC type, which indicates the SAP format is used to interpret the data of a business transaction. An IDOC type comprises a control record, which is identical for each IDOC type, data records and status records. One data record comprises a fixed key part and a variable data part, where the data part is interpreted using segments, which differ depending on the IDOC type selected and specify the format with which the data records of IDOCs are interpreted.

In a typical approach, a tool extracts data from an IDOC by placing the IDOC data into a file and having a procedural specification for how to read and transform the file, such as the files used by the Mercator™ system sold by TSI corporation. Converter 10 generates ABAP code to extract data from the IDOCs without needing to first place the data in files.

If necessary, converter 10 can treat individual segments and subsegments as relational tables and allow them to participate in relational queries or can generate the necessary ABAP code to perform the same function.

As described above, data can be extracted a SAP R/3 Enterprise Resource Planning system based on a visual and declarative specification of source objects, transformations and target objects. The system described above generates a program of optimized ABAP code to extract, transform and load those objects according to the specification. Source objects include Tables, Hierarchies, Files and IDOCs (intermediate documents). Transformations include standard SQL operations, lookups, joins, function calls, iterators, and custom ABAP blocks. Targets include files or tables.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

APPENDICES

A. Generated ABAP program (First Example)

```
1    REPORT ZAL_ABAP message-id 26 line-size 255
2    no standard page heading.
3    * za1.
4    PARAMETER DOWNLOAD(1) DEFAULT 'Y' lower case. "N-svr,Y-cInt
5    PARAMETER EXECMODE(1) DEFAULT 'D' lower case. "D-dlg,B-btch
6    PARAMETER OUT_DIR(60) DEFAULT "output file dir
7    'c:\temp' lower case.
8    PARAMETER IN_DIR(60) DEFAULT "input file dir
9    'v:' lower case.
10
11   TABLES VBAK.
12   TABLES VBAP.
13
14   DATA: begin of ITAB3 occurs 0,
15   VBELN(10) TYPE C,
16   POSNR(16) TYPE C,
17   AUART(4) TYPE C,
18   VKGRP(3) TYPE C,
19   VKBUR(4) TYPE C,
20   GUEBG TYPE D,
```

APPENDICES-continued

```
21    GUEEN TYPE D,
22    BNAME(35) TYPE C,
23    MATNR(18) TYPE C,
24    MATWA(18) TYPE C,
25    KMPMG(7) TYPE P DECIMALS 3,
26    WAVWR(7) TYPE P DECIMALS 2,
27    NETPR(6) TYPE P DECIMALS 2.
28    DATA: end of ITAB3.
29
30    data: append_flag(1) value ' ',
31             cntbuf type i,
32             delimleng type i.
33
34    start-of-selection.
35
36    PERFORM FORM3.
37    PERFORM FORM4.
38
39    end-of-selection.
40    write /'* Program Complete * copyright Acta Technology, Inc.'.
41    FORM FORM3.
42    DATA ALTMP1(10) TYPE C.
43    DATA ALTMP2(6) TYPE C.
44    DATA ALTMP3(4) TYPE C.
45    DATA ALTMP4(3) TYPE C.
46    DATA ALTMP5(4) TYPE C.
47    DATA ALTMP6 TYPE D.
48    DATA ALTMP7 TYPE D.
49    DATA ALTMP8(35) TYPE C.
50    DATA ALTMP9(18) TYPE C.
51    DATA ALTMP10(18) TYPE C.
52    DATA ALTMP11(7) TYPE P DECIMALS 3.
53    DATA ALTMP12(7) TYPE P DECIMALS 2.
54    DATA ALTMP13(6) TYPE P DECIMALS 2.
55
56    select
57        VBELN
58        AUART
59        VKGRP
60        VKBUR
61        GUEBG
62        GUEEN
63        BNAME
64    into corresponding fields of VBAK from VBAK.
65    ALTMP1 = VBAK-VBELN.
66    ALTMP3 = VBAK-AUART.
67    ALTMP4 = VBAK-VKGRP.
68    ALTMP5 = VBAK-VKBUR.
69    ALTMP6 = VBAK-GUEBG.
70    ALTMP7 = VBAK-GUEEN.
71    ALTMP8 = VBAK-BNAME.
72    select
73        VBELN
74        POSNR
75        MATNR
76        MATWA
77        KMPMG
78        WAVWR
79        NETPR
80    into corresponding fields of VBAP from VBAP where
81    ( VBELN = VBAK-VBELN ).
82    ALTMP2 = VBAP-POSNR.
83    ALTMP9 = VBAP-MATNR.
84    ALTMP10 = VBAP-MATWA.
85    ALTMP11 = VBAP-KMPMG.
86    ALTMP12 = VBAP-WAVWR.
87    ALTMP13 = VBAP-NETPR.
88       move ALTMP1 to ITAB3-VBELN.
89       move ALTMP2 to ITAB3-POSNR.
90       move ALTMP3 to ITAB3-AUART.
91       move ALTMP4 to ITAB3-VKGRP.
92       move ALTMP5 to ITAB3-VKBUR.
93       move ALTMP6 to ITAB3-GUEBG.
94       move ALTMP7 to ITAB3-GUEEN.
95       move ALTMP8 to ITAB3-BNAME.
96       move ALTMP9 to ITAB3-MATNR.
97       move ALTMP10 to ITAB3-MATWA.
98       move ALTMP11 to ITAB3-KMPMG.
99       move ALTMP12 to ITAB3-WAVWR.
```

APPENDICES-continued

```
100     move ALTMP13 to ITAB3-NETPR.
101     append ITAB3.
102     if download = 'N'.
103        cntbuf = cntbut + 1.
104        if cntbuf > 5000.
105           perform FORM4.
106           clear cntbuf.
107           refresh ITAB3.
108           append_flag = 'A'.
109        endif.
110     endif.
111  endselect.
112  endselect.
113  ENDFORM.
114
115  FORM FORM4.
116  data: outfile(128), Idfile(32).
117  Idfile = 'out.dat'.
118  concatenate out_dir Idfile into outfile
119        separated by '/'.
120  data: begin of ht,
121            x(1) type x value '2C',
122            end of ht.
123  data dlmtlen type i value '1'.
124  data return_code type i.
125     perform write_delimited_file
126              tables    ITAB3
127              using     outfile
128                 append_flag
129                 ht
130                 dlmtlen
131                 download
132              changing return_code.
133
134     case return_code.
135        when 1.
136           IF EXECMODE = 'D'.
137              WRITE: /5 'No line selected'.
138           ELSE.
139              MESSAGE E098.
140           ENDIF.
141        when 2.
142           IF EXECMODE = 'D'.
143              WRITE: /5 'Open File Error --', 25 OUTFILE.
144           ELSE.
145              MESSAGE E107 WITH OUTFILE.
146           ENDIF.
147        when 3.
148           IF EXECMODE = 'D'.
149              WRITE: /5 'Data exceed length limit (8192)'.
150           ELSE.
151              MESSAGE E000 WITH
152                 'Data exceed length limit (8192)'.
153           ENDIF.
154        when 4.
155           IF EXECMODE = 'D'.
156              WRITE: /5 'Call function WS_DOWNLOAD error'.
157           ELSE.
158              MESSAGE E000 WITH
159                 'Call function WS_DOWNLOAD error'.
160           ENDIF.
161     endcase.
162  ENDFORM.
163
164  FORM SUBSTRING USING SRC BEG LEN CHANGING RET.
165
166  DATA: VA1 TYPE I.
167  DATA: VA2 TYPE I.
168  DATA: VA3 TYPE I.
169
170  VA3 = STRLEN( SRC ).
171
172  IF BEG < 1.    VA1 = 0.
173  ELSE.          VA1 = BEG - 1.
174  ENDIF.
175
176  IF LEN < 0.    VA2 = 0.
177  ELSE.          VA2 = VA3 - VA1.
178  ENDIF.
```

APPENDICES-continued

```
179
180    IF VA2 > LEN. VA2 = LEN.
181    ENDIF.
182
183    IF VA2 < 1.     MOVE "            TO RET.
184    ELSE.        MOVE SRC+VA1(VA2) TO RET.
185    ENDIF.
186
187    ENDFORM.
188
189    form write_delimited_file
190                  tables     datatab
191                  using      file
192                        append
193                        delimit
194                        dlength
195                        dwnload
196                  changing rc.
197
198        data: type 1,
199               appd(1),
200               temp(32),
201               time1(8),
202               date1(10),
203               output(8192),
204               rcount type i,
205               offset type i,
206               tablen type i,
207               maxlen type i value '8192'.
208
209        data: begin of clientab occurs 0,
210               output(8192),
211                 end of clientab.
212
213        field-symbols: <f>.
214
215        appd = append.
216        describe table datatab lines tablen.
217
218        if dwnload = 'Y'.
219             clear clientab. refresh clientab.
220             rcount = 0.
221        else.
222             if appd = space.
223                  open dataset file for output in text mode.
224             else.
225                  open dataset file for appending in text mode.
226             endif.
227             if sy-subrc <> 0.
228                  rc = 2. exit.
229             endif.
230        endif.
231
232        loop at datatab.
233             clear: tablen, offset, output.
234             do.
235                assign component sy-index of
236                    structure datatab to <f>.
237                if sy-subrc <> 0. exit. endif.
238                if sy-index > 1.
239                    write delimit to output+offset(dlength).
240                    add dlength to offset.
241                endif.
242
243                describe field <f> type type 1.
244
245                if type1 = 'I' or type1 = 'N'.
246                    type1 = 'P'.
247                endif.
248
249                case type1.
250                  when 'D'.
251                      if <f> = '00000000'.
252                      <f> = ' '.
253                      else.
254                      move <f> to time1.
255                      assign time1 to <f>.
256                      endif.
257                  when 'F'.
```

APPENDICES-continued

```
258             if <f> = '0.0'.
259          temp = '0.0'.
260             else.
261           write <f> to temp exponent 0.
262             endif.
263             condense temp no-gaps.
264             translate temp using ',.'.
265             assign temp to <f>.
266          when 'P'.
267             if <f> < 0.
268             write '-' to output+offset(1).
269             add 1 to offset.
270             <f> = <f> * (−1 ).
271             endif.
272             move <f> to temp.
273             condense temp no-gaps.
274             translate temp using ',.'.
275             assign temp to <f>.
276        endcase.
277
278        sy-fdpos = strlen( <f> ).
279
280        tablen = offset + sy-fdpos.
281        if tablen > maxlen.
282           rc = 3. exit.
283        endif.
284        write <f> to output+offset(sy-fdpos).
285        add sy-fdpos to offset.
286     enddo.
287
288     if dwnload = 'Y'.
289        clientab-output = output.
290        append clientab.
291        rcount = rcount + 1.
292        if rcount >= 50.
293           CALL FUNCTION 'WS_DOWNLOAD'
294           EXPORTING
295              FILENAME       = file
296              FILETYPE       = 'DAT'
297              MODE           = appd
298           TABLES
299              DATA_TAB           = clientab
300           exceptions
301              file_open_error            = 1
302              file_write_error           = 2
303              invalid_filesize       = 3
304              invalid_table_width            = 4
305              invalid_type          = 5
306              no_batch     = 6
307              unknown_error                = 7
308              others       = 8.
309           if sy-subrc <> 0.
310        rc = 4.
311           endif.
312           clear clientab. refresh clientab.
313           rcount = 0. appd = 'A'.
314        endif.
315     else.
316        transfer output to file.
317     endif.
318  endloop.
319
320  if dwnload = 'Y'.
321        CALL FUNCTION 'WS_DOWNLOAD'
322           EXPORTING
323              FILENAME       = file
324              FILETYPE       = 'DAT'
325              MODE           = appd
326           TABLES
327              DATA_TAB           = clientab
328           exceptions
329              file_open_error            = 1
330              file_write_error         = 2
331              invalid_filesize       = 3
332              invalid_table_width            = 4
333              invalid_type          = 5
334              no_batch   = 6
335              unknown_error                = 7
336              others         = 8.
```

APPENDICES-continued

```
337                  if sy-subrc <> 0.
338                  rc = 4.
339                  endif.
340         else.
341                  close dataset file.
342         endif.
343    endform.
```

B. Generated ABAP program (Second Example)

```
1     REPORT ZAL_ABAP message-id 26 line-size 255
2     no standard page heading.
3     * za1.
4     PARAMETER DOWNLOAD(1) DEFAULT 'Y' lower case. "N-svr,Y-cInt
5     PARAMETER EXECMODE(1) DEFAULT 'D' lower case. "D-dlg,B-btch
6     PARAMETER OUT_DIR(60) DEFAULT "output file dir
7     'c:\temp' lower case.
8     PARAMETER IN_DIR(60) DEFAULT "input file dir
9     'v:' lower case.
10
11    TABLES VBAK.
12    TABLES VBAP.
13
14    DATA: begin of ITAB3 occurs 0,
15    VBELN(10) TYPE C,
16    POSNR(6) TYPE C,
17    AUART(4) TYPE C,
18    VKGRP(3) TYPE C,
19    VKBUR(4) TYPE C,
20    GUEBG TYPE D,
21    GUEEN TYPE D,
22    BNAME(35) TYPE C,
23    MATNR(18) TYPE C,
24    MATWA(18) TYPE C,
25    KMPMG(7) TYPE P DECIMALS 3,
26    WAVWR(7) TYPE P DECIMALS 2,
27    NETPR(6) TYPE P DECIMALS 2.
28    DATA: end of ITAB3.
29
30    data: append_flag(1) value ' ',
31          cntbuf type i,
32          delimleng type i.
33
34    start-of-selection.
35
36    PERFORM FORM3.
37    PERFORM FORM4.
38
39    end-of-selection.
40    write /'* Program Complete * copyright Acta Technology, Inc.'.
41    FORM FORM3.
42    DATA ALTMP1(10) TYPE C.
43    DATA ALTMP2(6) TYPE C.
44    DATA ALTMP3(4) TYPE C.
45    DATA ALTMP4(3) TYPE C.
46    DATA ALTMP5(4) TYPE C.
47    DATA ALTMP6 TYPE D.
48    DATA ALTMP7 TYPE D.
49    DATA ALTMP8(35) TYPE C.
50    DATA ALTMP9(18) TYPE C.
51    DATA ALTMP10(18) TYPE C.
52    DATA ALTMP11(7) TYPE P DECIMALS 3.
53    DATA ALTMP12(7) TYPE P DECIMALS 2.
54    DATA ALTMP13(6) TYPE P DECIMALS 2.
55
56    select
57         VBELN
58         POSNR
59         MATNR
60         MATWA
61         KMPMG
62         WAVWR
63         NETPR
64    into corresponding fields of VBAP from VBAP where
65    ( POSNR = 'XYZ123' ).
66    ALTMP2 = VBAP-POSNR.
67    ALTMP9 = VBAP-MATNR.
68    ALTMP10 = VBAP-MATWA.
69    ALTMP11 = VBAP-KMPMG.
70    ALTMP12 = VBAP-WAVWR.
```

APPENDICES-continued

```
 71   ALTMP13 = VBAP-NETPR.
 72   select
 73       VBELN
 74       AUART
 75       VKGRP
 76       VKBUR
 77       GUEBG
 78       GUEEN
 79       BNAME
 80   into corresponding fields of VBAK from VBAK where
 81   ( VBELN = VBAK-VBELN ).
 82   ALTMP1 = VBAK-VBELN.
 83   ALTMP3 = VBAK-AUART.
 84   ALTMP4 = VBAK-VKGRP.
 85   ALTMP5 = VBAK-VKBUR.
 86   ALTMP6 = VBAK-GUEBG.
 87   ALTMP7 = VBAK-GUEEN.
 88   ALTMP8 = VBAK-BNAME.
 89      move ALTMP1 to ITAB3-VBELN.
 90      move ALTMP2 to ITAB3-POSNR.
 91      move ALTMP3 to ITAB3-AUART.
 92      move ALTMP4 to ITAB3-VKGRP.
 93      move ALTMP5 to ITAB3-VKBUR.
 94      move ALTMP6 to ITAB3-GUEBG.
 95      move ALTMP7 to ITAB3-GUEEN.
 96      move ALTMP8 to ITAB3-BNAME.
 97      move ALTMP9 to ITAB3-MATNR.
 98      move ALTMP10 to ITAB3-MATWA.
 99      move ALTMP11 to ITAB3-KMPMG.
100      move ALTMP12 to ITAB3-WAVWR.
101      move ALTMP13 to ITAB3-NETPR.
102      append ITAB3.
103      if download = 'N'.
104         cntbuf = cntbut + 1.
105         if cntbuf > 5000.
106             perform FORM4.
107             clear cntbuf.
108             refresh ITAB3.
109             append_flag = 'A'.
110         endif.
111      endif.
112   endselect.
113   endselect.
114   ENDFORM.
115
116   FORM FORM4.
117   data: outfile(128), Idfile(32).
118   Idfile = 'out.dat'.
119   concatenate out_dir Idfile into outfile
120        separated by '/'.
121   data: begin of ht,
122             x(1) type x value '2C',
123             end of ht.
124   data dlmtlen type i value '1'.
125   data return_code type i.
126      perform write_delimited_file
127              tables    ITAB3
128              using     outfile
129                 append_flag
130                 ht
131                 dlmtlen
132                 download
133              changing return_code.
134
135      case return_code.
136          when 1.
137             IF EXECMODE = 'D'.
138                WRITE: /5 'No line selected'.
139             ELSE.
140                MESSAGE E098.
141             ENDIF.
142          when 2.
143             IF EXECMODE = 'D'.
144                WRITE: /5 'Open File Error --', 25 OUTFILE.
145             ELSE.
146                MESSAGE E107 WITH OUTFILE.
147             ENDIF.
148          when 3.
149             IF EXECMODE = 'D'.
```

APPENDICES-continued

```
150             WRITE: /5 'Data exceed length limit (8192)'.
151           ELSE.
152             MESSAGE E000 WITH
153               'Data exceed length limit (8192)'.
154           ENDIF.
155         when 4.
156           IF EXECMODE = 'D'.
157             WRITE: /5 'Call function WS_DOWNLOAD error'.
158           ELSE.
159             MESSAGE E000 WITH
160               'Call function WS_DOWNLOAD error'.
161           ENDIF.
162       endcase.
163    ENDFORM.
164
165    FORM SUBSTRING USING SRC BEG LEN CHANGING RET.
166
167    DATA: VA1 TYPE I.
168    DATA: VA2 TYPE I.
169    DATA: VA3 TYPE I.
170
171    VA3 = STRLEN( SRC ).
172
173    IF BEG < 1.    VA1 = 0.
174    ELSE.          VA1 = BEG - 1.
175    ENDIF.
176
177    IF LEN < 0.    VA2 = 0.
178    ELSE.          VA2 = VA3 - VA1.
179    ENDIF.
180
181    IF VA2 > LEN. VA2 = LEN.
182    ENDIF.
183
184    IF VA2 < 1.    MOVE "            TO RET.
185    ELSE.          MOVE SRC+VA1(VA2) TO RET.
186    ENDIF.
187
188    ENDFORM.
189
190    form write_delimited_file
191                tables    datatab
192                using     file
193                    append
194                    delimit
195                    dlength
196                    dwnload
197                changing rc.
198
199      data: type 1,
200            appd(1),
201            temp(32),
202            time1(8),
203            date1(10),
204            output(8192),
205            rcount type i,
206            offset type i,
207            tablen type i,
208            maxlen type i value '8192'.
209
210      data: begin of clientab occurs 0,
211            output(8192),
212            end of clientab.
213
214      field-symbols: <f>.
215
216      appd = append.
217      describe table datatab lines tablen.
218
219      if dwnload = 'Y'.
220          clear clientab. refresh clientab.
221          rcount = 0.
222      else.
223          if appd = space.
224              open dataset file for output in text mode.
225          else.
226              open dataset file for appending in text mode.
227          endif.
228          if sy-subrc <> 0.
```

APPENDICES-continued

```
229             rc = 2. exit.
230         endif.
231    endif.
232
233    loop at datatab.
234        clear: tablen, offset, output.
235        do.
236           assign component sy-index of
237               structure datatab to <f>.
238           if sy-subrc <> 0. exit. endif.
239           if sy-index > 1.
240               write delimit to output+offset(dlength).
241               add dlength to offset.
242           endif.
243
244           describe field <f> type type1.
245
246           if type1 = 'I' or type1 = 'N'.
247               type1 = 'P'.
248           endif.
249
250           case type1.
251             when 'D'.
252                if <f> = '00000000'.
253                   <f> = ' '.
254                else.
255                   move <f> to time1.
256                   assign time1 to <f>.
257                endif.
258             when 'F'.
259                if <f> = '0.0'.
260                   temp = '0.0'.
261                else.
262                   write <f> to temp exponent 0.
263                endif.
264                condense temp no-gaps.
265                translate temp using ',.'.
266                assign temp to <f>.
267             when 'P'.
268                if <f> < 0.
269                   write '-' to output+offset(1).
270                   add 1 to offset.
271                   <f> = <f> * ( -1 ).
272                endif.
273                move <f> to temp.
274                condense temp no-gaps.
275                translate temp using ',.'.
276                assign temp to <f>.
277           endcase.
278
279           sy-fdpos = strlen( <f> ).
280
281           tablen = offset + sy-fdpos.
282           if tablen > maxlen.
283              rc = 3. exit.
284           endif.
285           write <f> to output+offset(sy-fdpos).
286           add sy-fdpos to offset.
287        enddo.
288
289        if dwnload = 'Y'.
290           clientab-output = output.
291           append clientab.
292           rcount = rcount + 1.
293           if rcount >= 50.
294              CALL FUNCTION 'WS_DOWNLOAD'
295              EXPORTING
296                  FILENAME           = file
297                  FILETYPE           = 'DAT'
298                  MODE               = appd
299              TABLES
300                  DATA_TAB           = clientab
301              exceptions
302                  file_open_error              = 1
303                  file_write_error             = 2
304                  invalid_filesize             = 3
305                  invalid_table_width                 = 4
306                  invalid_type                 = 5
307                  no_batch         = 6
```

APPENDICES-continued

```
308                  unknown_error           = 7
309                  others            = 8.
310              if sy-subrc <> 0.
311                rc = 4.
312              endif.
313              clear clientab. refresh clientab.
314              rcount = 0. appd = 'A'.
315            endif.
316         else.
317              transfer output to file.
318         endif.
319       endloop.
320
321       if dwnload = 'Y'.
322           CALL FUNCTION 'WS_DOWNLOAD'
323              EXPORTING
324                FILENAME        = file
325                FILETYPE        = 'DAT'
326                MODE            = appd
327              TABLES
328                DATA_TAB             = clientab
329              exceptions
330                file_open_error          = 1
331                file_write_error         = 2
332                invalid_filesize         = 3
333                invalid_table_width          = 4
334                invalid_type        = 5
335                no_batch   = 6
336                unknown_error            = 7
337                others       = 8.
338              if sy-subrc <> 0.
339                rc = 4.
340              endif.
341          else.
342              close dataset file.
343          endif.
344    endform.
```

C. IDOC Description

The following is an example of an IDOC format:

1. Output IDoc type: BLAORD01 Purchasing contracts

| | | | | |
|---|---|---|---|---|
| E1EDK01 | M | 1 | 1 | IDoc: Document header general data |
| E1EDKD1 | M | 1 | 1 | IDoc: Doc.header additional data |
| E1EDK14 | C | 1 | 99 | IDoc: Doc.header organizational data |
| E1EDK03 | C | 1 | 99 | IDoc: Document header date segment |
| E1EDKA1 | C | 1 | 99 | IDoc: Doc.header partner information |
| E1EDK02 | C | 1 | 99 | IDoc: Document header reference data |
| E1EDK17 | C | 1 | 99 | IDoc: Doc.header terms of delivery |
| E1EDK18 | C | 1 | 99 | IDoc: Doc.header terms of payment |
| E1EDKP1 | C | 1 | 999 | IDoc: Doc.header partner in purchasing |
| E1EDP01 | C P | 1 | 999999 | IDoc: Doc.item general data |
| E1EDP02 | C | 1 | 99 | IDoc: Doc.item reference data |
| E1EDP19 | C | 1 | 99 | IDoc: Doc.item object identification |
| E1EDP17 | C | 1 | 99 | IDoc: Doc.item terms of delivery |
| E1EDPD1 | C | 1 | 1 | IDoc: Doc.item additional data |
| E1EDS01 | C | 1 | 99 | IDoc: Summary segment general |

2. Output IDoc type: BLAORD01 Purchasing contracts

| | | | | |
|---|---|---|---|---|
| E1EDK01 | M | 1 | 1 | IDoc: Document header general data |
| ACTION | | | 3 | Action code for the whole EDI message |
| KZABS | | | 1 | Indicator for order acknowledgment requirement |
| CURCY | | | 3 | Currency |
| HWAER | | | 3 | EDI local currency |
| WKURS | | | 12 | Exchange rate |
| ZTERM | | | 17 | Terms of payment key |
| KUNDEUINR | | | 20 | VAT registration number |
| EIGENUINR | | | 20 | VAT registration number |
| BSART | | | 4 | Document type |
| BELNR | | | 35 | IDOC document number |
| NTGEW | | | 18 | Net weight |
| BRGEW | | | 18 | Net weight |
| GEWEI | | | 3 | Weight unit |
| FKART_RL | | | 4 | Invoice list type |
| ABLAD | | | 25 | Unloading point |
| BSTZD | | | 4 | Purchase order number supplement |
| VSART | | | 2 | Shipping type |
| VSART_BEZ | | | 20 | Description of the shipping type |
| RECIPNT_NO | | | 10 | Number of recipient (for control via the ALE model) |
| E1EDKD1 | M | 1 | 1 | IDoc: Doc.header additional data |
| EKORG | | | 4 | Purchasing organization |
| EKGRP | | | 3 | Purchasing group |
| E1EDK14 | C | 1 | 99 | IDoc: Doc.header organizational data |
| QUALF | | | 3 | IDOC qualifier organization |
| ORGID | | | 35 | IDOC organization |
| E1EDK03 | C | 1 | 99 | IDoc: Document header date segment |
| IDDAT | | | 3 | Qualifier for IDOC date segment |
| DATUM | | | 8 | IDOC: Date |
| UZEIT | | | 6 | IDOC: Time |
| E1EDKA1 | C | 1 | 99 | IDoc: Doc.header partner information |
| PARVW | | | 3 | Partner function (e.g. sold-to party, ship-to party, . . .) |

2. Output IDoc type: BLAORD01 Purchasing contracts

| Field | | | Length | Description |
|---|---|---|---|---|
| PARTN | | | 17 | Partner number |
| LIFNR | | | 17 | Vendor number at customer location |
| NAME1 | | | 35 | Name 1 |
| NAME2 | | | 35 | Name 2 |
| NAME3 | | | 35 | Name 3 |
| NAME4 | | | 35 | Name 4 |
| STRAS | | | 35 | Street and house number 1 |
| STRS2 | | | 35 | Street and house number 2 |
| PFACH | | | 35 | PO box |
| ORT01 | | | 35 | City |
| COUNC | | | 9 | County code |
| PSTLZ | | | 9 | Postal code |
| PSTL2 | | | 9 | Postal code of PO box |
| LAND1 | | | 3 | Country key |
| ABLAD | | | 35 | Unloading point |
| PERNR | | | 30 | Contact person's personnel number |
| PARNR | | | 30 | Contact person's number (not personnel number) |
| TELF1 | | | 25 | 1st telephone number of contact person |
| TELF2 | | | 25 | 2nd telephone number of contact person |
| TELBX | | | 25 | Telebox number |
| TELFX | | | 25 | Fax number |
| TELTX | | | 25 | Teletex number |
| TELX1 | | | 25 | Telex number |
| SPRAS | | | 1 | Language key |
| ANRED | | | 15 | Title |
| ORT02 | | | 35 | District |
| HAUSN | | | 6 | House number |
| STDCK | | | 6 | Floor |
| REGIO | | | 3 | Region |
| PARGE | | | 1 | Partner's sex |
| ISOAL | | | 2 | Country ISO code |
| ISONU | | | 2 | Country ISO code |
| FCODE | | | 20 | Company key (France) |
| IHREZ | | | 30 | Your reference (partner's) |
| BNAME | | | 35 | IDOC user name |
| PAORG | | | 30 | IDOC organization code |
| ORGTX | | | 35 | IDOC organization code |
| PAGRU | | | 30 | IDOC group code |
| E1EDK02 | C | | 99 | IDoc: Document header reference data |
| QUALF | | | 3 | IDOC qualifier reference document |
| BELNR | | | 35 | IDOC document number |
| POSNR | | | 6 | Item number |
| DATUM | | | 8 | IDOC: |
| UZEIT | | | 6 | IDOC: Time |
| E1EDK17 | C | 1 | 99 | IDoc: Doc.header terms of delivery |
| QUALF | | | 3 | IDOC qualifier: Terms of delivery |
| LKOND | | | 3 | IDOC delivery condition code |
| LKTEXT | | | 70 | IDOC delivery condition text |
| E1EDK18 | C | 1 | 99 | IDoc: Doc.header terms of payment |
| QUALF | | | 3 | IDOC qualifier: Terms of payment |
| TAGE | | | 8 | IDOC Number of days |
| PRZNT | | | 8 | IDOC percentage for terms of payment |
| ZTERM_TXT | | | 70 | Line of text |
| E1EDKP1 | C | 1 | 999 | IDoc: Doc.header partner in purchasing |
| EKORG | | | 4 | Purchasing organization |
| LTSNR | | | 6 | Vendor sub-range |
| WERKS | | | 4 | Plant |
| PARVW | | | 2 | Partner function ID (e.g. SH for ship-to party) |
| LIFN2 | | | 10 | Reference to other vendor |
| DEFPA | | | 1 | Default partner |
| E1EDP01 | C P | 1 | 999999 | IDoc: Doc.item general data |
| POSEX | | | 6 | Item number |
| ACTION | | | 3 | Action code for the item |
| PSTYP | | | 1 | Item category |
| KZABS | | | 1 | Indicator for order acknowledgment requirement |
| MENGE | | | 15 | Quantity |
| MENEE | | | 3 | Unit of measure |
| BMNG2 | | | 15 | Quantity in price unit |
| PMENE | | | 3 | Price unit of measure |
| ABFTZ | | | 7 | Agreed cumulative quantity |
| VPREI | | | 15 | Price (net) |
| PEINH | | | 9 | Price unit |
| NETWR | | | 18 | Item value (net) |
| ANETW | | | 18 | Absolute net value of item |
| SKFBP | | | 18 | Amount qualifying for cash discount |
| NTGEW | | | 18 | Net weight |
| GEWEI | | | 3 | Weight unit |
| EINKZ | | | 1 | Flag: More than one schedule line for the item |
| CURCY | | | 3 | Currency |
| PREIS | | | 18 | Gross price |
| MATKL | | | 9 | IDOC material class |
| UEPOS | | | 6 | Higher-level item in BOM structures |
| GRKOP | | | 3 | Delivery group (items delivered together) |
| EVERS | | | 7 | Shipping instructions |
| BPUMN | | | 6 | Denominator for conv. of order price unit into order unit |
| BPUMZ | | | 6 | Numerator for conv. of order price unit into order unit |
| ABGRU | | | 2 | Reason for rejection of quotations and sales orders |
| ABGRT | | | 40 | Description |
| E1EDP02 | C | 1 | 99 | IDoc: Doc.item reference data |
| QUALF | | | 3 | IDOC qualifier reference document |
| BELNR | | | 35 | IDOC document number |
| ZEILE | | | 6 | Item number |
| DATUM | | | 8 | IDOC: Date |
| UZEIT | | | 6 | IDOC: Time |
| E1EDP19 | C | 1 | 99 | IDoc: Doc.item object identification |
| QUALF | | | 3 | IDOC object ID such as material no., customer |
| IDTNR | | | 35 | IDOC material ID |
| KTEXT | | | 70 | IDOC short text |
| E1EDP17 | C | 1 | 99 | IDOC: Doc.item terms of delivery |
| QUALF | | | 3 | IDOC qualifier: Terms of delivery |
| LKOND | | | 3 | IDOC delivery condition code |
| LKTEXT | | | 70 | IDOC delivery condition text |
| LPRIO | | | 2 | Delivery priority |
| E1EDPD1 | C | 1 | 1 | IDoc: Doc.item additional data |
| KNTTP | | | 1 | Account assignment category |
| BEDNR | | | 10 | Requirement tracking number |
| PRSDR | | | 1 | Indicator: print price |
| UNTTO | | | 4 | Underdelivery tolerance limit |
| UEBTO | | | 4 | overdelivery tolerance limit |
| UEBTK | | | 1 | Indicator: unlimited over-delivery allowed |
| INSMK | | | 1 | Quality inspection indicator |
| SPINF | | | 1 | Indicator: update info record |
| MAHN1 | | | 4 | Number of days for first reminder/urging letter |
| MAHN2 | | | 4 | Number of days for second reminder/urging letter |
| MAHN3 | | | 4 | Number of days for third reminder/urging letter |
| BSTAE | | | 4 | Confirmation control key |
| LABNR | | | 20 | Order acknowledgment number |
| KZABS | | | 1 | Indicator: acknowledgement required |
| SCHPR | | | 1 | Estimated price indicator |
| MWSKZ | | | 2 | Tax code |
| WEBRE | | | 1 | Indicator: GR-based invoice verification |
| E1EDS01 | C | 1 | 99 | IDoc: Summary segment general |
| SUMID | | | 3 | Qualifier for totals segment for shipping notification |
| SUMME | | | 18 | Total value of sum segment |
| SUNIT | | | 3 | Total value unit for totals seg. in shipping notif. |
| WAERQ | | | 3 | Currency |

What is claimed is:

1. A method of generating procedural language code for extracting data from an operational system, the method comprising the steps of:

accepting a declarative specification;

determining imported metadata from the operational system for the declarative specification; and generating procedural language code from the declarative specification using the determined metadata, to execute a data extraction, transformation and loading process defined by the declarative specification.

2. The method of claim 1, wherein the procedural language code is ABAP language code and the operational system is an SAP R/3 system.

3. The method of claim 2, further comprising a step of determining an optimized plan for performing the data extraction, transformation, and loading process using the metadata and the declarative specification; and using the optimized plan to generate the procedural language code from the declarative specification.

4. The method of claim 1, wherein the declarative specification is a visual specification.

5. The method of claim 1, wherein the declarative specification includes at least one of a scalar function, a vector function, parameterized declarative extraction specifications, custom ABAP code or a lookup operation.

6. The method of claim 1, wherein the step of generating includes a step of generating ABAP code to read and load R/3 tables, files and IDOC intermediate documents.

7. The method of claim 1, wherein the step of generating includes the steps of:

reading a single declarative specification for extraction of SAP R/3 and non-SAP R/3 data including relational databases and files; and executing the specification as a set of ABAP programs, SQL queries and in-memory transformation modules to extract, transform and load data from multiple sources.

8. The method of claim 1, wherein the step of generating procedural language code is a step of generating ABAP code with parameter expressions to be evaluated at run time.

9. The method of claim 1, further comprising the steps of:

integrating an IDOC intermediate document with relational tables;

generating ABAP code to extract data from integrated intermediate documents and relational tables.

10. The method of claim 9, further comprising a step of processing individual tables as relational tables.

11. The method of claim 10, wherein the step of processing is a step of generating ABAP code.

12. A method of generating procedural language code for extracting data from an operational system, the method comprising:

determining a declarative specification;

determining metadata for the declarative specification;

determining an optimized plan for performing a data extraction, transformation, and loading process using the metadata and the declarative specification; and generating procedural language code from the declarative specification using the optimized plan, to execute a data extraction, transformation and loading process defined by the declarative specification.

13. The method of claim 12, further comprising validating the declarative specification using the metadata.

14. The method of claim 13, further comprising converting a parameter in the declarative specification based on the validation.

15. The method of claim 12, wherein the procedural language code is ABAP language code and the operational system is an SAP R/3 system.

16. The method of claim 12, further comprising providing a visual interface to a user.

17. The method of claim 16, further comprising receiving visual specifications from the visual interface, wherein determining the declarative specification comprises generating the declarative specification from the received visual specification.

18. A method of generating procedural language code for extracting data from an operational system, the method comprising the steps of:

importing metadata about data in the operational system;

accepting a declarative specification;

determining imported metadata for the declarative specification;

validating the declarative specification against the determined imported metadata and generating procedural language code from the declarative specification to execute a data extraction, transformation and loading process defined by the declarative specification.

* * * * *